Sept. 29, 1959  L. KOCSI  2,906,141
SPEED LIMITING DEVICE FOR VEHICLES
Filed Nov. 28, 1955  2 Sheets-Sheet 2
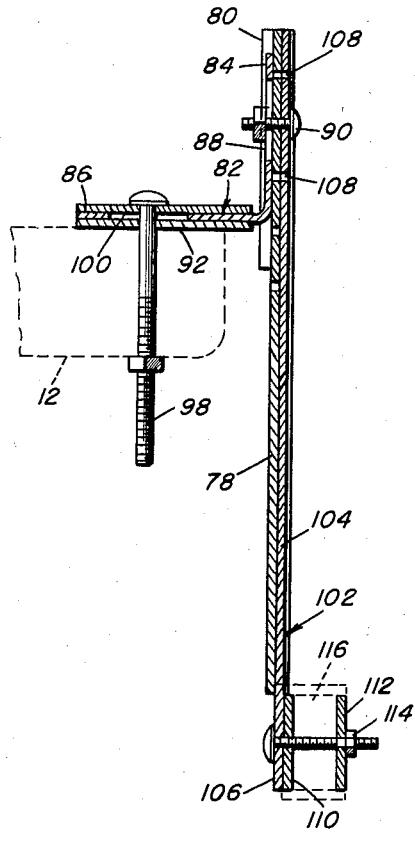
Fig. 4
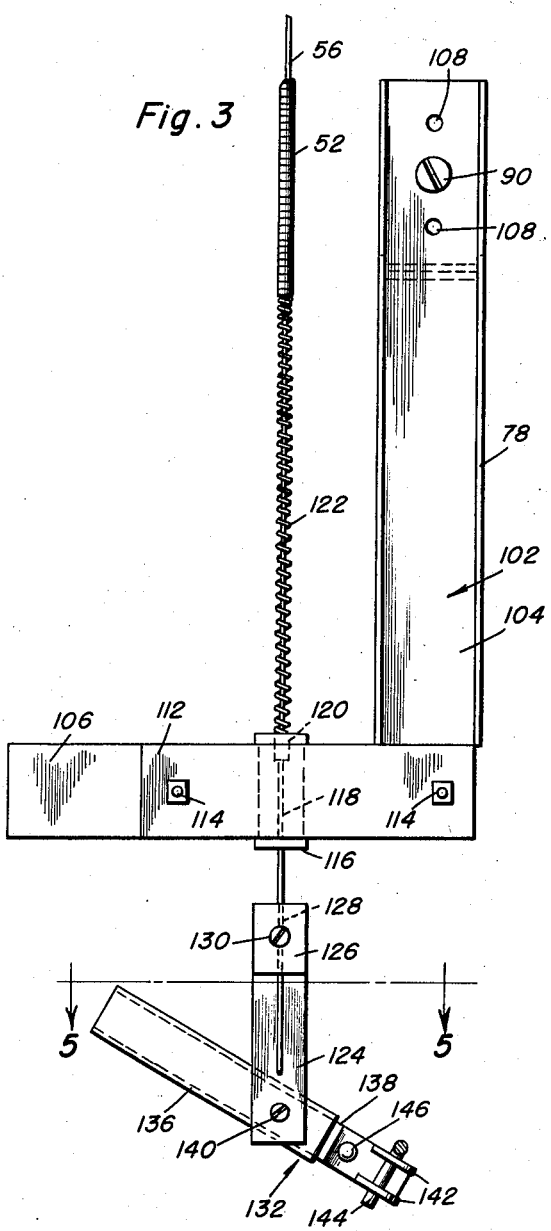
Fig. 3
Fig. 5
Louis Kocsi
INVENTOR.
BY

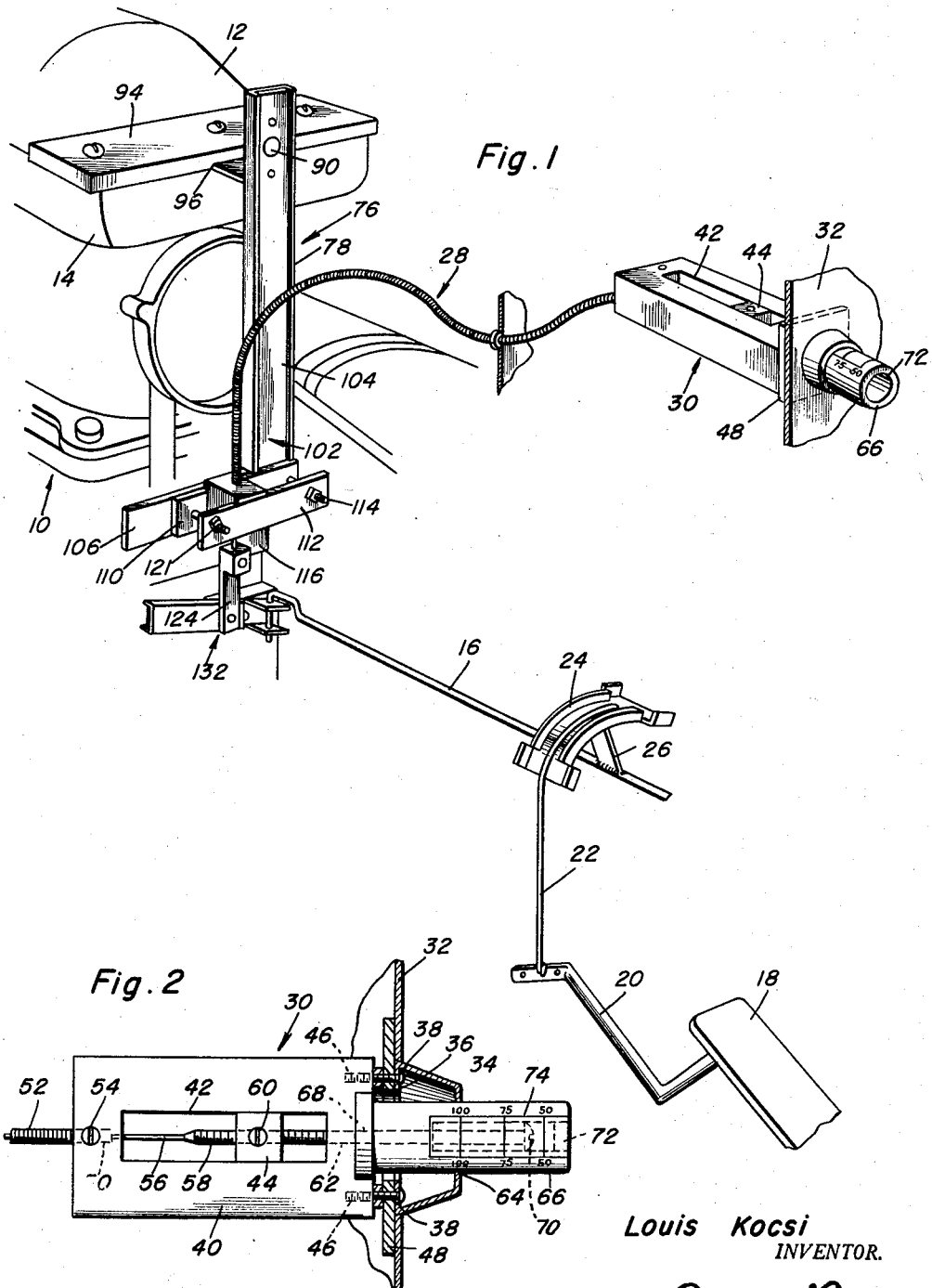

United States Patent Office 2,906,141
Patented Sept. 29, 1959

2,906,141

SPEED LIMITING DEVICE FOR VEHICLES

Louis Kocsi, Garfield, N.J.

Application November 28, 1955, Serial No. 549,227

4 Claims. (Cl. 74—482)

This invention relates in general to new and useful improvements in control devices for internal combustion engines, and more specifically to an improved carburetor gas controller.

In the operation of an automobile, it is desirable that there be provided some type of control to function as a governor so that under normal driving conditions the maximum speed of the vehicle will be automatically controlled, and at the same time the control is so constructed whereby it may be temporarily overridden in cases of emergency. It is therefore the primary object of this invention to provide a carburetor gas controller which is so constructed whereby it may be attached to the gas control linkage of a carburetor of the average internal combustion engine whereby the maximum opening of the butterfly control of the carburetor may be controlled under normal conditions and at the same time the control may be temporarily overridden by exerting additional pressure on the accelerator pedal whereby the speed of the vehicle is controlled by the controller and at the same time maximum opening of the butterfly valve may be accomplished if necessary.

Another object of this invention is to provide an improved carburetor gas controller of the type which may be mounted on conventional types of carburetors in vehicles and which may be provided with a control knob mounted on the instrument panel or other suitable position within a vehicle body so that the carburetor gas controller may be manually set at the desired speed by the driver of the vehicle.

A further object of this invention is to provide an improved carburetor gas controller which is provided with a suitable fitting for attachment to the gas control linkage of the carburetor and which has a control knob for setting the same, there being provided a control cable between the control knob and the fitting, the control cable being mounted within a cable housing which has a coil spring extension for effectively operating the controller.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a vehicle carburetor and gas control linkage, there being mounted on the carburetor in conjunction with the gas control linkage the carburetor gas controller which is the subject of this invention;

Figure 2 is an enlarged fragmentary horizontal view taken through the instrument panel of a vehicle on which the gas controller is mounted and shows the specific details of the controller assembly thereof;

Figure 3 is an elevational view of the opposite end of the gas controller and shows the specific details of a mounting bracket adapted to be mounted on the air cleaner for a carburetor;

Figure 4 is an enlarged vertical sectional view taken through the mounting bracket of Figure 3 and shows the specific details of the means for attaching the same to a carburetor air cleaner; and Figure 5 is an enlarged transverse sectional view taken substantially upon the plane indicated by the section line 5—5 of Figure 4 and shows the specific details of the linkage which is mounted as part of the control linkage of the carburetor.

Referring now to the drawings in detail, it will be seen that there is illustrated a carburetor, which is referred to in general by the reference numeral 10. The carburetor 10 is part of a conventional type of vehicle now on the market and includes an air cleaner 12 having a flat rear portion 14.

The carburetor 10 is provided with a control butterfly valve (not shown) which is mounted between an open position and a closed position through a shaft 16 by rotating the shaft 16 about its own axis. In order to accomplish the rotation of the shaft 16, the vehicle of which the carburetor 10 forms a part is provided with a gas pedal 18 to which there is connected a suitable lever assembly 20. The lever assembly 20 has connected thereto a cable 22 which in turn is connected to an arcuate plate 24 over which a portion of the cable 22 extends. The arcuate plate 24 is generally circular in configuration and having the axis of the shaft 16 as its center. The plate 24 is connected to the shaft 16 by a suitable bar 26 so that rotation of the shaft 16 is possible. The foregoing control mechanism is also conventional and is part of a 1941 Nash.

In order to control the maximum opening of the butterfly valve of the carburetor 10 under normal driving conditions, there is provided the carburetor gas controller, which is the subject of this invention, the gas controller being referred to in general by the reference numeral 28. The gas controller 28 includes a first mounting bracket, which is referred to in general by the reference numeral 30 and which is secured to an instrument panel 32 of the vehicle of which the carburetor 10 is a part.

Referring now to Figure 2 in particular, it will be seen that the instrument panel 32 includes a rearwardly bowed portion 34 which may be considered cup-shaped. Disposed within the bowed portion 34 is a mounting flange 36. Passing through the mounting flange 36 are suitable mounting bolts 38 which support the first mounting bracket 30.

The first mounting bracket 30 includes a mounting block 40. The mounting block 40 has formed therein a suitable longitudinal guideway 42 in which there is mounted for longitudinal sliding movement a block 44.

In order that the mounting block 40 may be secured to the instrument panel 32, the rear end thereof is provided with internally threaded bores 46. The bores 46 receive the mounting bolts 38 which also pass through a reinforcing plate 48 disposed rearwardly of the instrument panel 32.

Aligned with the forward end of the guideway 42 is a bore 50 in which there is received the rear end of a cable housing 52 which is preferably of the flexible type. The cable housing 52 is secured to the mounting block 40 by means of a set screw 54. Passing through the cable housing 52 is a control cable 56. The rear end of the control cable 56 passes into the guideway 42 and is secured to a threaded fitting 58. The threaded fitting 58 passes through the slide block 44 and is adjustably secured thereto by means of a set screw 60. The threaded fitting 58 passes rearwardly through the mounting block 40 through a bore 62 formed therein in alignment with the bore 50.

Seated in the rear part of the mounting block 40 and extending rearwardly therefrom through an opening 64 in the projection portion 34 of the instrument panel 32 is a control knob 66. The control knob 66 mounted for rotation and movable longitudinally relative to the mounting block 40 has the forward portion thereof in the form of an internally threaded bore 68 which threadedly receives the fitting 58. The fitting 58 is provided with a head 70 to limit the relative longitudinal movement of the control knob 66 with respect to the fitting 58.

The control knob 66 is set by rotating it about its axis. Inasmuch as the control knob 66 is provided with an internally threaded bore 68 which threadedly receives the fitting 58, and since the fitting 58 is prevented from rotating by its connection with the slide block 44, it will be seen that rotation of the control knob 66 will result in its longitudinal movement on the fitting 58. This in turn results either in an extension or shortening of the control cable 56.

In order that the control knob 66 may be properly set, the rear part thereof is in the form of an enlarged bore 72 of a size to receive the head 70. The control knob 66 is transparent in the vicinity of the bore 72 and is provided with a suitable scale 74 to facilitate the setting thereof, the head 70 cooperating with the scale 74. If desired, the bore 72 may be closed by a suitable plug.

Referring now to Figures 1, 3 and 4 in particular, it will be seen that the gas controller 28 also includes a second mounting bracket which is referred to in general by the reference numeral 76. The mounting bracket 76 includes a vertical channel-shaped member 78 which normally faces rearwardly, as is best illustrated in Figure 1. The upper part of the channel-shaped member 78 also includes a forwardly disposed channel portion 80, as is best illustrated in Figure 4. Adjustably secured to the forward channel portion 80 of the channel-shaped member 78 is an L-shaped bracket which is referred to by the reference numeral 82. The bracket 82 includes a vertical leg 84 and a horizontal leg 86. The vertical leg 84 is provided with a vertical slot 88 which adjustably receives a fastener 90 extending through the channel member 78. In order that the angle bracket 82 may be adjustably secured to the air cleaner 12, there is mounted in overlying relation to the flat portion 14 thereof a plate 92. Overlying the plate 92 is a hollow channel-shaped member 94 having terminal flanges, as is best illustrated in Figure 1. The flanges 94 are suitably recessed as at 96 to receive the horizontal flange 86 of the angle bracket 84. The plate 92 and the channel cover 94 are secured to the air cleaner 12 by a plurality of bolts 98. One of the bolts 98 passes through the horizontal flange 86 which is provided with a longitudinal slot 100 to facilitate longitudinal adjustment of the angle bracket 82.

Vertically adjustably carried by the channel member 78 is an L-shaped member 102. The L-shaped member 102 includes a vertical portion 104 and a horizontal portion 106. The vertical portion 104 is disposed within the confines of the channel members 78 and is adjustably secured thereto by the fastener 90 which is selectively passed through a plurality of vertically spaced apertures 108.

Secured to the rear face of the horizontal portion 106 of the L-shaped member 102 is a plate 110. A similar plate 112 is disposed rearwardly of the plate 110 and connected thereto by a suitable adjustable fastener 114. The plates 110 and 112 together with the fasteners 114 form a suitable clamp. In lieu of the nut and bolt fastener shown, the apertures in the plate 112 may be tapped. Also suitable spacers may be placed between the plate 110 and the portion 106.

Positioned between the plates 110 and 112 is a generally H-shaped member 116 which is mounted for movement transversely of the vehicle of which the carburetor 10 is a part whereby the H-shaped member 116 may be aligned with the carburetor 10 as desired. The H-shaped member 116, is, of course, clamped in a desired adjusted position.

Extending through the H-shaped member 116 is a vertical bore 118 through which the control cable 56 slidably passes. The bore 118 includes an upper enlarged portion 120. It is pointed out at this time that the cable housing 52 terminates short of the H-shaped member 116 and that the space between the H-shaped member 116 and the cable housing 52 is filled by a coil spring 122 carried by the control cable 56. One end of the coil spring 122 is seated in the bore 120.

Adjustably carried by the forward end of the control cable 56 is a link 124 which includes a connector block 126. The connector block 126 has a bore 128 therethrough through which passes the control cable 56. The control cable 56 is adjustably secured to the connector block 126 by means of a set screw 130.

Pivotally connected to the lower end of the link 124 is a fitting which is referred to in general by the reference numeral 132. The fitting 132 includes a channel member 136 which has slidably received therein a strap 138 which is secured to the channel member 136 by means of a fastener 140. The fastener 140 also passes through the link 124 and functions as a pivotal connector between the link 124 and the fitting 132.

The strap 138 is provided at one end thereof with a pair of spaced parallel ears 142. Extending between the ears 142 is an offset end 144 of the shaft 16. The strap 138 is connected by means of a fastener 146 to a suitable control for the carburetor 10 whereby when the fitting 132 is swung by the rotation of the shaft 16 about the axis of the fastener 146, the butterfly valve (not shown) of the carburetor 10 is rocked between an opened and a closed position.

In the normal operation of the carburetor 10 by means of the shaft 16, the shaft 16 is free to rotate back and forth to completely open the butterfly valve. The present invention serves to provide a stop for limiting the rotation of the shaft 16, this stop being the control knob 66. When the butterfly valve is in a closed position, the control knob 66 is spaced from the mounting block 40. As the butterfly valve is moved to an open position, the cable 56 pulls the control knob 66 towards the mounting block 40 and engagement of the control knob 66 with the mounting block 40 limits the movement of the shaft 16 and the butterfly valve. It is to be understood that when the shaft 16 is rotated to a butterfly valve opening position, it rotates in a counterclockwise direction, as viewed and looking forwardly in Figure 1. Therefore, by effectively shortening the control cable 56 by means of the control knob 66 which translates axially and acts as a positive stop, the amount the shaft 16 can be rotated is normally limited. However, in the event of an emergency, by exerting a relatively great pressure on the gas pedal 18, the shaft 16 may be rotated further than that position for which the gas controller 28 is set by compressing the spring 122. On the other hand, the normal tension of the spring 122 is such that the fitting 132 is urged to an "idle" position when the gas pedal 18 is released.

From the foregoing description of the gas controller, which is the subject of this invention, it will be readily apparent that there has been devised a gas controller which may be mounted on any make of modern vehicle for controlling the operation of the carburetor thereof. It is to be understood that certain minor changes may have to be made in the mounting brackets and the fittings depending upon the make of vehicle or carburetor. However, these changes will be of such a nature so as not to change the principles of the invention. The invention is of such a nature whereby the normal maximum speed of the vehicle may be controlled for safe driving, but at the same time the gas controller 28 may be overridden so as to provide a control device which is effective for the purpose desired and at the same time does not impair the safety of the vehicle to which it is attached by limiting the maximum acceleration of a vehicle through the use of a device which cannot be overridden.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A speed limiting device for attachment to the carburetor control linkage of motor vehicles comprising a first mounting bracket having attachment means for securement within a vehicle body, a second mounting bracket having support means for mounting said second mounting bracket immediately adjacent a carburetor, a control cable extending between said mounting brackets and slidable relative thereto, a control knob carried by said first mounting bracket for limited sliding movement remote from said second mounting bracket, a threaded fitting secured to one end of said control cable and threadedly engaging said control knob whereby said control knob may be rotated to adjustably position said control cable relative to said second mounting bracket, and a carburetor control fitting secured to the other end of said control cable, said carburetor control fitting being connected to said carburetor control linkage.

2. A speed limiting device for attachment to the carburetor control linkage of motor vehicles comprising a first mounting bracket having attachment means for securement within a vehicle body, a second mounting bracket having support means for mounting said second mounting bracket immediately adjacent a carburetor, a control cable extending between said mounting brackets and slidable relative thereto, a control knob carried by said first mounting bracket for limited sliding movement remote from said second mounting bracket, a threaded fitting secured to one end of said control cable and threadedly engaging said control knob whereby said control knob may be rotated to adjustably position said control cable relative to said second mounting bracket, and a carburetor control fitting secured to the other end of said control cable, said carburetor control fitting being connected to said carburetor control linkage, said control knob being provided with a scale for setting said speed limiting device at a predetermined maximum speed.

3. A speed limiting device for attachment to the carburetor control linkage of motor vehicles comprising a first mounting bracket having attachment means for securement within a vehicle body, a second mounting bracket having support means for mounting said second mounting bracket immediately adjacent a carburetor, a control cable extending between said mounting brackets and slidable relative thereto, a control knob carried by said first mounting bracket for limited sliding movement remote from said mounting bracket, a threaded fitting secured to one end of said control cable and threadedly engaging said control knob whereby said control knob may be rotated to adjustably position said control cable relative to said second mounting bracket, and a carburetor control fitting secured to the other end of said control cable, said carburetor control fitting being connected to said carburetor control linkage, a flexible cable housing anchored at one end to one of said mounting brackets, said cable housing receiving said control cable, a coil spring mounted on said control cable, one end of said coil spring abutting the other end of said cable housing, the other end of said coil spring abutting the other of said mounting brackets whereby said speed control device may be overridden.

4. A speed limiting device for attachment to the carburetor control linkage of motor vehicles comprising a first mounting bracket having attachment means for securement within a vehicle body, a second mounting bracket having support means for mounting said second mounting bracket immediately adjacent a carburetor, a control cable extending between said mounting brackets and slidable relative thereto, a control knob carried by said first mounting bracket for limited sliding movement remote from said second mounting bracket, a threaded fitting secured to one end of said control cable and threadedly engaging said control knob whereby said control knob may be rotated to adjustably position said control cable relative to said second mounting bracket, and a carburetor control fitting secured to the other end of said control cable, said carburetor control fitting being connected to said carburetor control linkage, said control knob being provided with a scale for setting said speed control device at a predetermined maximum speed, a flexible cable housing anchored at one end to one of said mounting brackets, said cable housing receiving said control cable, a coil spring mounted on said control cable, one end of said coil spring abutting the other end of said cable housing, the other end of said coil spring abutting the other of said mounting brackets whereby said speed control device may be overridden.

References Cited in the file of this patent

UNITED STATES PATENTS

| Number | Name | Date |
|---|---|---|
| 975,497 | Becker | Nov. 15, 1910 |
| 1,284,523 | Williams | Nov. 12, 1918 |
| 1,404,785 | Michon | Jan. 31, 1922 |
| 1,615,926 | Amoroso | Feb. 1, 1927 |
| 1,620,649 | Hartz | Mar. 15, 1927 |
| 1,710,488 | Oliphant | Apr. 23, 1929 |
| 2,045,169 | Tong | June 23, 1936 |
| 2,130,578 | Baker | Sept. 20, 1938 |
| 2,136,500 | Griese | Nov. 15, 1938 |
| 2,180,442 | Tondeur | Nov. 21, 1939 |
| 2,186,620 | Aprea | Jan. 9, 1940 |
| 2,240,919 | Weintraub | May 6, 1941 |
| 2,358,597 | Russell | Sept. 19, 1944 |
| 2,818,747 | Rich | Jan. 7, 1958 |
| 2,822,702 | Scheppe | Feb. 11, 1958 |

FOREIGN PATENTS

| 1,100,538 | France | Apr. 6, 1955 |